(12) United States Patent
Keller et al.

(10) Patent No.: US 10,724,556 B2
(45) Date of Patent: Jul. 28, 2020

(54) FASTENING ELEMENT FOR WORKSTATION ACCESSORIES, MOUNTING SYSTEM AND FURNITURE SYSTEM

(71) Applicant: Vitra Patente AG, Birsfelden (CH)

(72) Inventors: Stefan Keller, Hofen (DE); Helmut Schütt, Hügelheim (DE)

(73) Assignee: VITRA PATENTE AG, Birsfelden (CH)

( * ) Notice: Subject to any disclaimer, the term of this patent is extended or adjusted under 35 U.S.C. 154(b) by 65 days.

(21) Appl. No.: 15/786,296

(22) Filed: Oct. 17, 2017

(65) Prior Publication Data

US 2018/0112693 A1 Apr. 26, 2018

(30) Foreign Application Priority Data

Oct. 20, 2016 (EP) .................................... 16194813

(51) Int. Cl.
*F16B 2/10* (2006.01)
*F16B 2/02* (2006.01)
(Continued)

(52) U.S. Cl.
CPC ............... *F16B 2/10* (2013.01); *F16B 2/02* (2013.01); *F16B 5/0607* (2013.01); *F16B 7/04* (2013.01);
(Continued)

(58) Field of Classification Search
CPC .. F16B 2/10; F16B 2/02; F16B 5/0607; F16B 5/0692; F16B 7/04; F16B 12/32; F16B 21/082; H01R 13/62955; F16C 11/103
See application file for complete search history.

(56) References Cited

U.S. PATENT DOCUMENTS 3,014,488 A * 12/1961 Seaman ................. A47L 15/241
134/46
3,088,024 A * 4/1963 Lowell ..................... F21V 21/08
362/388
(Continued)

FOREIGN PATENT DOCUMENTS

DE 10 2011 013289 B4 12/2014
DE 20 2015 005754 U1 11/2015
GB 2 445 153 A 7/2008

OTHER PUBLICATIONS

European Search Report for EP 16 19 4813.8, dated Mar. 6, 2017.

*Primary Examiner* — Victor D Batson
*Assistant Examiner* — Matthew J Sullivan
(74) *Attorney, Agent, or Firm* — Medler Ferro Woodhouse & Mills PLLC (57) ABSTRACT

A fastening element comprises a first clamping element and a second clamping element rotatably mounted about an axis of rotation on the first clamping element. The first and second clamping elements each have a first or second lever section, which extends essentially perpendicular to the axis of rotation, and a first or second connecting section, which extend away from that essentially parallel to the axis of rotation. The first lever section and the second lever section are moveable relative to one another about an axis of rotation between a splayed lever position and a non-splayed lever position. The first clamping element and the second clamping element are configured to hold the article when the first lever section and the second lever section are located in the splayed lever position, and to not hold the article when they are located in the non-splayed lever position. The first and second clamping elements each comprise a first or second support section, which extends essentially perpendicular to the axis of rotation, is connected stationarily to the lever section, and extends at an obtuse angle to the lever section. The first support section and the second support section are located in a non-splayed support position when the first and second lever sections are located in the splayed (Continued)

lever position. The first and second support section are located in a splayed support position when the first and second lever sections are located in the non-splayed lever position.

18 Claims, 6 Drawing Sheets

(51) Int. Cl.
  *F16B 5/06* (2006.01)
  *F16B 7/04* (2006.01)
  *F16C 11/10* (2006.01)
  *F16B 12/32* (2006.01)
  *H01R 13/629* (2006.01)

(52) U.S. Cl.
  CPC ............ *F16C 11/103* (2013.01); *F16B 12/32* (2013.01); *H01R 13/62955* (2013.01)

(56) References Cited

U.S. PATENT DOCUMENTS

| | | | | |
|---|---|---|---|---|
| 4,834,352 A | * | 5/1989 | Thornton | B25B 5/06 |
| | | | | 269/203 |
| 4,885,667 A | * | 12/1989 | Selden | F21V 21/088 |
| | | | | 362/253 |
| 4,895,329 A | * | 1/1990 | Sloan | F21L 15/08 |
| | | | | 248/229.16 |
| 5,769,560 A | * | 6/1998 | Quam | E04F 15/02405 |
| | | | | 108/64 |
| 9,321,168 B2 | * | 4/2016 | Brassette | B25H 1/04 |
| 9,687,036 B2 | * | 6/2017 | Ditnes | A41F 17/02 |
| 10,226,117 B1 | * | 3/2019 | Baxter | A45F 5/00 |
| 2010/0329774 A1 | | 12/2010 | Komamura | |
| 2017/0356713 A1 | * | 12/2017 | Williams | F41A 23/02 |
| 2019/0099026 A1 | * | 4/2019 | Yadin | F16M 13/02 |

* cited by examiner

FASTENING ELEMENT FOR WORKSTATION ACCESSORIES, MOUNTING SYSTEM AND FURNITURE SYSTEM

TECHNICAL FIELD

The invention relates to a fastening element according to the preamble of independent claim 1, and a mounting system using such a fastening element and a furniture system. The invention may be used in particular in the field of office or workstation furniture for mounting objects, in particular workstation accessories, on an article like a workstation or tabletop.

BACKGROUND OF THE INVENTION

Fastening elements are often used that can be clamped on a workstation or tabletop in order to be able to arrange workstation accessories, e.g., lighting means, in particular workstation or desk lights, computer monitors or shelves or auxiliary tables for telecommunication devices, among others, at or on workstations or tabletops in a space-saving and demand-based way.

A corresponding fastening element is known, for example, from DE 20 2008 015 190 U1. The fastening element shown there has two conventional clamping jaws which are pivotably connected via a pin.

A potential disadvantage of many known fastening elements for clamping of workstation accessories may be seen in that, under certain circumstances, they may not guarantee a necessary or desired stability for fastening relatively large and/or heavy articles, or are relatively awkward to mount.

Therefore, DE 10 2011 013 289 B4 proposes a fastening element in the form of a clamping device, with which a high stability may be achieved for the articles being held. However, the claimed clamping device is designed in a relatively complicated way, being constructed from a comparatively large number of individual parts. In addition, a tool, for example a screwdriver or a hex wrench, is necessary for applying or loosening the clamping device.

In this context, it is the object of the invention to provide a fastening element or a fastening system by means of which the previously described disadvantages may be avoided.

SUMMARY OF THE INVENTION

The problem is solved according to the invention by a fastening element as defined in independent claim 1, and by a mounting system as defined in independent claim 17, and a furniture system as defined in independent claim 18. Advantageous embodiments of the invention are derived from the dependent claims.

The essence of the invention comprises the following: A fastening element for positive-locking or clamping fastening on a particularly plate-shaped article, for example, a tabletop, comprises a first clamping element and a second clamping element which is rotatable or tiltable or foldable about an axis of rotation relative to the first clamping element. The first clamping element has a first lever section extending essentially perpendicular to the axis of rotation and a first connecting section extending away from the first lever section essentially parallel to the axis of rotation. Analogously, the second clamping element has a second lever section extending essentially perpendicular to the axis of rotation and a second connecting section extending away from the second lever section essentially parallel to the axis of rotation. The first lever section of the first clamping element and the second lever section of the second clamping element are moveable with respect to one another about an axis of rotation between a splayed lever position and a non-splayed lever position. The first clamping element and the second clamping element are additionally configured to hold the article when the first lever section of the first clamping element and the second lever section of the second clamping element are located in the splayed lever position, and not to hold the article when the first lever section of the first clamping element and the second lever section of the second clamping element are located in the non-splayed lever position.

The first clamping element comprises a first support section extending essentially perpendicular to the axis of rotation. The first support section is stationarily connected to the first lever section of the first clamping element and extends at an obtuse angle to the first lever section of the first clamping element. The second clamping element comprises a second support section extending essentially perpendicular to the axis of rotation. The second support section is stationarily connected to the second lever section of the second clamping element and extends at an obtuse angle to the second lever section of the second clamping element. The first support section of the first clamping element and the second support section of the second clamping element are located in a non-splayed support position when the first lever section of the first clamping element and the second lever section of the second clamping element are located in the splayed lever position. The first support section of the first clamping element and the second support section of the second clamping element are located in a splayed support position when the first lever section of the first clamping element and the second lever section of the second clamping section are located in the non-splayed lever position.

The expression "article", as it is used in conjunction with the invention, may relate in particular to an object on which the fastening element is to be fixed. In particular, another object may be mounted on the article via the fastening element. The article is thereby, in particular, a plate-shaped article, like a tabletop or workstation, or something similar. The additional object may be a workstation accessory, or a desk accessory, for example, a light, a computer monitor, a partition, a shelf or an auxiliary table for a telephone or the like.

The expression "non-splayed" in conjunction with the lever sections and the support sections may relate to a position in which the two lever sections or the two support sections completely or virtually completely contact one another or are aligned parallel to one another. For this purpose, the lever sections or the support sections are folded or rotated virtually maximally on top of one another in a first orientation. In the non-splayed lever or support position, the lever sections or the support sections typically contact one another. By folding the lever sections together, the article may be released. The fastening element may thus be located in an open position in the non-splayed lever position. Analogously, in the non-splayed support position, the first and second support sections may be folded or rotated virtually maximally on top of one another.

The expression "splayed" in conjunction with the lever sections and the support sections may relate to the two lever sections or the two support sections being tilted or pivoted or folded or rotated away from one another about an axis of rotation. In the splayed position, the first and section lever sections are maximally or virtually maximally folded or rotated away from one another in a second orientation opposite to the first orientation. The article may be held due to this folding away from one another. The fastening element may thus be located in a closed position. Analogously, in the splayed support position, the first and second support sections may be folded or rotated virtually maximally away from one another.

The expression "to hold" and variants thereof may relate, in conjunction with the invention, to a connection that is sufficiently fixed and stable for fastening the fastening element. In particular such a holding may be carried out via positive locking, clamping, or a mixture of the same.

The first clamping element and the second clamping element may be connected to one another such that they are mounted with respect to one another in a rocker-like manner about the axis of rotation. Thus, it may be efficiently achieved that the first and second lever sections are splayed away from another when the first and second support sections are folded together.

The fastening element according to the invention may be fixed in a detachable positive-locking or clamping way on the at least approximately plate-shaped article, for example, a tabletop or workstation; however, also on a board, a plank, a bookcase, a shelf of a book case, among others, a crown of a cabinet. The fastening element is initially brought into the open position or at least approximately into the open position by rotating the clamping elements about the axis of rotation in the first orientation, which is accomplished in particular in that the two lever sections are moved toward one another and in particular are pressed together or toward one another.

The fastening element may be subsequently pushed or placed on the plate-shaped article in such a way that one part of the fastening element contacts a first surface of the plate-shaped article; in contrast, the first and second connecting sections are located in a position with respect to a second surface of the plate-shaped article. The plate-shaped article or its edge is thus enclosed by the fastening element. A thickness of the plate-shaped article should thereby be less than a maximum width of a retaining area of the fastening element. In other words, the fastening element encloses the plate-shaped article at least approximately in a U-shape, wherein the lever section preferably functions as a stop and defines how far the fastening element may be maximally pushed or placed on the plate-shaped article.

As soon as the fastening element is pushed or placed on the plate-shaped article, it may be moved in the direction of the closed position by rotating the clamping elements about the axis of rotation in the second orientation. According to the invention, this may be accomplished easily and efficiently, in that the two support sections are moved toward one another and in particular are pressed together or toward one another. The two support sections may, for example, be pressed toward one another manually and without using a tool.

A width of the retaining area is continually reduced by rotating the clamping elements about the axis of rotation in the second orientation, in particular by pressing the support sections together. Starting at one instant or one relative position of the two clamping elements, in which the first and second connecting sections contact the second surface of the plate-shaped article or in which the width of the retaining area corresponds to a thickness of an area of the plate-shaped article projecting into the retaining area, another rotation of the clamping element about the axis of rotation in the second rotation is no longer possible or only possible by distorting the fastening element and/or the plate-shaped article. These types of deformation occur in particular if the two support sections are pressed together or against one another with increasing force.

If the fastening element is now locked so that the relative position of the two clamping elements is fixed, then the fastening element is firmly held on the plate-shaped article. A static friction thereby prevents the fastening element from being able to slip off or be pulled off of the plate-shaped article. The lock may be thereby carried out exclusively based on friction in a bearing, by means of which bearing the second clamping element is rotatably mounted on the first clamping element. However, locking means are preferably present, in particular in the form of an elastic pretension and/or in the form of fixing means which are attached to or on the fastening element, in particular the support sections, as is explained in greater detail below.

An object, in particular a workstation accessory, may now be mounted on the support sections. The object may be connected to the support sections and thus indirectly to the article. The fastening element according to the invention may be handled in an extremely easy way and in particular without tools, and may also be operated with one hand with minimal training. Furthermore, the fastening element according to the invention may be produced and assembled particularly efficiently and cost effectively, as it comprises only a few individual parts, in particular the two clamping elements.

In other words, the fastening element according to the invention enables an efficient and in particular tool-free mounting of an object on the article. The fastening element may thereby be relatively easily designed from a few parts, which enables a relatively cost-efficient production. The first clamping element and the second clamping element are each preferably designed as one piece. Such a one-piece configuration enables a particularly easy and efficient design and production of the fastening element. The clamping elements may be produced from a plastic material, for example, using injection moulding technology. Or they may be manufactured as zinc die casting.

The fastening element preferably comprises a contact area, extending preferably at least in the direction of the axis of rotation, which is configured to contact the article during a fastening of the fastening element on the article, during which the first lever section of the first clamping element and the second lever section of the second clamping element are located in the splayed lever position. Such a contact surface may enable a stable and firm holding of the article by the fastening element.

A retaining area is thereby preferably formed between the contact area and both of the first connecting section of the first clamping element and the second connecting section of the second clamping element, the width or depth of the retaining area in the splayed lever position of the first lever section of the first clamping element and the second lever section of the second clamping element being smaller than in the non-splayed lever position of the first lever section of the first clamping element and the second lever section of the second clamping element.

A shortest distance between a plane, in which the first connecting section of the first clamping element and the second connecting section of the second clamping element are positioned, and the contact area in the splayed lever position of the first lever section of the first clamping element and the second lever section of the second clamping element is preferably smaller than in the non-splayed lever position of the first lever section of the first clamping element and the second lever section of the second clamping element.

The expression "shortest distance" relates in this context to the smallest distance between the plane and the contact area. The shortest distance is thus located where the plane and the contact area are closest to one another. Generally, a plurality of distances may be identified between the plane and the contact area, whereby the shortest possible distance corresponds to the shortest spacing. In case the clamping element is designed to be virtually mirror symmetrical, or in case the first and second lever sections are approximately the same length, then the shortest distance typically extends at a right angle from the plane.

Such an arrangement may enable a purpose-built change of the components of the fastening element relevant for holding. Thus, the fastening element may efficiently hold the article. In particular, the article may be arranged between the plane and the contact section. The article may be efficiently held in that the distance is reduced by expanding the first and second lever sections or by pressing together the support sections.

The first clamping element preferably has a first contact section and the second clamping element preferably has a second contact section, which together form the contact area. Such a configuration of the clamping element enables an efficient realization of the contact area with relatively few parts.

The fastening element preferably comprises a spring element which is arranged such that the first clamping element and the second clamping element are pressed into the splayed lever position and into the non-splayed support position. In this way, the fastening element may be pretensioned such that it holds without active actuation. This means that without the lever sections being pressed toward one another, they are in the splayed lever position and hold the article positioned as intended.

The spring element thereby preferably has an elastic band which is arranged around the first support section of the first clamping element and the second support section of the second clamping element. Such an elastic band enables a relatively easy and efficiently functioning implementation of the spring element which may also be replaced relatively easily as needed. The elastic band may be designed in particular in the form of an O-ring.

The first support section of the first clamping element and the second support section of the second clamping element thereby preferably each have a groove in which the elastic band is positioned. Such a groove may easily and efficiently prevent slipping or other displacement of the elastic band.

The first lever section of the first clamping element and the second lever section of the second clamping element each preferably have two longitudinal ends, wherein the axis of rotation is arranged in an area of one of the longitudinal ends and the first connecting section or the second connecting section is arranged in an area of the other of the longitudinal ends. Such an arrangement enables an efficient expanding and closing of the lever sections relative to one another. A relatively large force may be transferred to the clamping sections via the virtual maximum leverage, which enables a relatively strong holding.

The first connecting section of the first clamping element and the second connecting section of the second clamping element each preferably have a protrusion or a projection, which extends in the direction toward the axis of rotation and/or toward the contact area. Such protrusions or projections enable a securing of the fastening element against slipping from the article in addition to holding. For example, the protrusions or projections may hook into a suitable structure of the article and thus secure the fastening element on the article.

In a preferred embodiment of the fastening element according to the invention, a third projection, in particular in the form of a third protrusion, is formed on the contact area, which extends in the direction away from the axis of rotation and/or away from the contact area.

The first contact section of the first clamping element is preferably formed by a planar first surface area designed on the first clamping element, and the second contact section of the second clamping element is formed by a planar surface area designed on the second clamping element. The first and the second planar surface areas are thereby preferably positioned essentially in a plane in the closed position of the fastening element such that they form the contact area.

The two support sections of the fastening element preferably extend in the closed position in such a way that objects, like workstation accessories, for example, workstation or desk lights, computer monitors, or shelves or auxiliary tables for telephones, and also holders for workstation accessories of the previously mentioned type, may be mounted on this by means of corresponding mounting means: the mounting means are thereby preferably designed as fixing means which lock the fastening element in the closed position, pretension into the closed position, and/or press the two support sections in particular together or toward one another. Preferably, the two support sections extend in the closed position of the fastening element at least approximately parallel to one another, wherein in addition the outer surfaces of the support sections facing away from the respectively opposite support section preferably define an outer surface of a common cylinder or of a cone that tapers away from the axis of rotation. The two support sections most preferably form in the closed position a cylinder extending perpendicular to the axis of rotation or a cone that tapers away from the axis of rotation, wherein they preferably contact one another with the planar surface areas mutually facing one another.

The first support section of the first clamping element and the second support section of the second clamping element preferably form together in the non-splayed support position, in which they preferably contact one another, a cylinder extending perpendicular to the axis of rotation. Such a cylinder enables an efficient fastening of an object on the fastening element and indirectly on the article. For example, a tube may be slipped over the cylinder on which the object is fastened. The tube may additionally prevent that the support sections may be splayed. Thus, the fastening element may be locked and secured on the article.

The corresponding mounting means thereby preferably comprise at least one cylindrical or conic opening and/or borehole, which is dimensioned in such a way that it may be pushed or placed precisely on at least one of the support sections, preferably on the two support sections of the fastening element in the closed position or the support element. In particular, the mounting means may comprise a tubular section formed for example as a support tube.

The clamping elements are preferably designed as elastic at least to a certain extent. This enables the fastening element to fasten on a plate-shaped article, which has a thickness d that slightly exceeds a width $w_{closed}$ of the retaining area or a distance in the closed position, in particular by 1% to 20%, preferably by 2% to 5%. This may have the effect that the fastening element pushed or placed on the plate-shaped article does not initially have to be brought completely into the closed position. If the two support sections are now pressed together or toward one another with increasing force, an elastic deformation of the fastening element may occur. If the fastening element is locked in this type of deformed state, a force is generated, due to the elastic deformation, on the first surface and the second surface, by which means a clamping effect is improved, and the fastening element is additionally prevented from slipping or being pulled off of the plate-shaped article.

The first clamping element preferably has a cylindrical opening or borehole in an area between the first support section and first lever section, said borehole extending parallel to the axis of rotation, for rotatable mounting of the second clamping element. This may enable an efficient rotatable mounting of the clamping elements on one another.

Another aspect of the invention relates to a mounting system for detachable mounting of an object on a particularly plate-shaped article, which comprises a fastening element as described above and a retaining strip. The retaining strip thereby has a fastening structure with which it is attachable to an edge of the article and is dimensioned such that the first clamping element of the clamp and the second clamping element of the fastening element hold the retaining strip when the first lever section of the first clamping element of the fastening element and the second lever section of the second clamping element of the clamp are located in the splayed lever position, and do not hold the retaining strip when the first lever section of the first clamping element of the fastening element and the second lever section of the second clamping element of the fastening element are located in the non-splayed lever position. Using such a mounting system, the effects and advantages described above in conjunction with the fastening element and its preferred embodiments may be efficiently realized. An article, for example, a tabletop may be efficiently retrofitted by means of the retaining strip.

Another additional aspect of the invention relates to a furniture system with a particularly plate-shaped article comprising a first, in particular, upper surface and a second, in particular, lower surface extending parallel and lying opposite the first, a fastening element as described above being fastened in a closed position on the article, wherein the contact area of the fastening element contacts the first surface, and the first connecting section of the first clamping element of the fastening element and the second connecting section of the second clamping element of the fastening element contact the second surface. Using such a furniture system, the effects and advantages described above in conjunction with the fastening element and its preferred embodiments may be efficiently realized.

Preferably, a first undercut running parallel to the edge is provided in the second surface in an area of an edge of the particularly plate-shaped article. Furthermore, the particularly plate-shaped article preferably has a thickness d, and the thickness d slightly exceeds the width $w_{closed}$ of the retaining area in the closed position, in particular by 1% to 20%, preferably by 2% to 5%.

At a suitable spacing of the first undercut from the edge, a fastening element according to the invention with first and second protrusions or projections provided on the end of the connecting sections may be fixed on the particularly plate-shaped article in such a way that the first and the second projection project into the first undercut in the closed position, while the first and/or second contact areas contact the first surface, and preferably the first and the second connecting sections contact the second surface. An extension of the projections is selected preferably parallel to the axis of rotation such that they do not exceed a width of the first undercut perpendicular to the longitudinal direction. The combination made from protrusions or projections and the first undercut enables an additional stabilization of the fastening element and additionally secures it against slipping off or from accidentally being pulled off of the particularly plate-shaped article. Furthermore, by means of an extension of the undercut in the direction parallel to the edge, an area may be defined or limited which is provided for mounting objections in particular, workstation accessories. It may thus be prevented, for example, that very heavy workstation accessories are mounted too close in the area of the corners of the desktop or tabletop, where they would potentially negatively influence a stability of the desktop or tabletop or even the entire furniture system.

In configurations of the furniture system according to the invention, a groove is provided on the first surface in the area of the edge of the particularly plate-shaped article running parallel to the edge, preferably in the form of a second undercut. At a suitable spacing of the second undercut from the edge, a fastening element with third or fourth protrusions provided on the first and/or second connecting sections may be fixed on the particularly plate-shaped article in such a way that the third or fourth projection projects into the first undercut in the closed position, while the first and/or second contact areas contact the first surface, and preferably the first and the second connecting sections contact the second surface. An extension of the third or fourth projection is selected preferably parallel to the axis of rotation such that it does not exceed a width of the second undercut perpendicular to the longitudinal direction. The combination made from third or fourth protrusions or projections and the second undercut enables an additional stabilization of the fastening element and additionally secures it against slipping off or from accidentally being pulled off of the particularly plate-shaped article. Furthermore, by means of an extension of the second undercut in the direction parallel to the edge, an area may be defined or limited which is provided for mounting objects, in particular, workstation accessories.

The particularly plate-shaped article may preferably be designed as one piece, wherein the first and/or second undercut may be formed, for example, by material removal, like by means of milling in the first or second surface in the area of an edge. A first distance of the first and second projections from the lever arms is thereby preferably selected such that it at least approximately corresponds to or ultimately slightly exceeds a distance of the first undercut from the edge, and a second distance of the third and/or fourth projections from the lever arms is selected such that it at least approximately corresponds to or ultimately slightly exceeds a distance of the second undercut from the edge.

In embodiments of the furniture system according to the invention, the first and/or second undercut is implemented by means of a two- or multipart structure of the particularly plate-shaped article. A retaining strip is thereby fastened on an edge of a particularly plate-shaped base body, which may be a tabletop or workstation, a board, a plank, a bookcase, a shelf of a book case, among others, a crown of a cabinet, etc., and the retaining strip is dimensioned such that the first clamping element of the fastening element and the second clamping element of the fastening element hold the retaining strip when the first lever section of the first clamping element and the second lever section of the second clamping element are located in the splayed position, and preferably do not hold the retaining strip when the first lever section of the first clamping element and the second lever section of the second clamping element are located in the non-splayed position.

In embodiments of the furniture system according to the invention, the retaining strip thereby has a first undercut or a first groove in which the first projection of the first connecting section of the first clamping element and the second projection of the second connecting section of the second clamping element of the fastening element are arrangeable, and/or a second undercut or a second groove, in which the third projection of the first clamping element and the fourth projection of the second clamping element of the fastening element are arrangeable when the first clamping element of the fastening element and the second clamping element of the fastening element hold the retaining strip.

In embodiments of the furniture system according to the invention, a first undercut or a first groove is formed between the retaining strip and the particularly plate-shaped base body, in which the first projection of the first connecting section of the first clamping element and the second projection of the second connecting section of the second clamping element of the fastening element are arrangeable when the first clamping element of the fastening element and the second clamping element of the fastening element hold the retaining strip, and/or a second undercut or a second groove is formed, in which the third projection of the first clamping element and the fourth projection of the second clamping element of the fastening element are arrangeable when the first clamping element of the fastening element and the second clamping element of the fastening element hold the retaining strip.

The retaining strip is thereby preferably designed as a profile strip, in particular, made from metal, wood, or a rigid plastic material. The retaining strip preferably has an essentially L- or U-shaped cross section. The retaining strip additionally preferably has a fastening structure, by means of which it is fastenable on an edge of a particularly plate-shaped article.

In the case of a two-part or multipart structure of the particularly plate-shaped article, a first and/or second undercut may thus be provided in an easy and efficient way in the first or second surface of the article, without the need for material removal, for example, by milling, which in particular represents a substantial manufacturing advantage in the case of large desktops or tabletops.

When using a retaining strip as previously described, an existing, plate-shaped article, like, in particular, a tabletop or workstation; however also a board, a plank, a bookcase, a shelf of a book case, among others, a crown of a cabinet, etc., may be retrofitted in order to obtain a furniture system according to the invention in conjunction with a fastening element according to the invention.

BRIEF DESCRIPTION OF THE DRAWINGS

Additional advantageous configurations of the invention arise from the subsequent description of the embodiments of the invention with the aid of the schematic drawings. In particular, the fastening element according to the invention is subsequently described in detail with reference to the included drawings with the aid of the embodiments.

WAY(S) TO IMPLEMENT THE INVENTION

Certain expressions are used in the following description for practical reasons and are not to be understood as limiting. The words "right", "left", "below", and "above" indicate directions in the drawing which is being referenced. The expressions "inwardly", "outwardly", "beneath", "above", "to the left of", "to the right of", or the like are used to describe the arrangement of designated parts relative to one another, the movement of designated parts relative to one another, and the directions toward or away from the geometric center of the invention and the listed parts of the same as shown in the figures. These relative spatial directions also comprise other positions and directions than those shown in the figures. For example, if a part shown in the figures is rotated, then elements or features that were described as "below" are then "above". The terminology comprises the above, explicitly mentioned words, derivations of the same, and words of similar meaning.

In order to avoid repetitions in the figures and the associated description of the different aspects and embodiments, certain features are to be understood as common for different aspects and embodiments. The omission of one aspect in the description or in a figure does not allow for the conclusion that this aspect is lacking in the associated embodiment. Rather, such an omission may increase clarity and prevent repetitions. In this context, the following definition applies for the entire subsequent description: If reference numerals are contained in one figure for the purpose of graphic clarity; however, not mentioned in the directly associated textual description, then reference is made to the detailed explanation thereof in the preceding descriptions of the figures. If, in addition, reference numerals are mentioned in the textual description directly associated with a figure, which reference numerals are not included in the associated figure, then reference is made to the preceding and following figures. Similar reference numerals in two or more figures indicate similar or identical elements.

FIG. 1, FIG. 2, FIG. 3, and FIG. 4 show an embodiment of a fastening element 1 according to the invention in the form of a clamp in a closed position or in a splayed lever position or a non-splayed support position. Fastening element 1 functions for positive locking fastening on a plate-shaped article, in particular a tabletop, and comprises a one-piece first clamping element 11 and a one-piece second clamping element 12 rotatably mounted with respect to an axis of rotation D on first clamping element 11. First clamping element 11 has a first base section 110, which essentially has a shape of a cuboid extended longitudinally in the direction of the axis of rotation. In the area of an upper side of first base section 110, a first support section 111 is formed, which has a form of a half cylinder extended upward perpendicular to axis of rotation D and with one planar and one cylindrical surface area. In a front area and on an underside of first base section 110, a first lever section 112 is formed, which extends essentially perpendicular to axis of rotation D and extends in an obtuse angle α to the first support section. On an underside of first base section 110, a first, planar surface area 113 is formed, which functions as a first contact section of a contact area of fastening element 1. In an area of one end of first lever section 112 spaced apart from axis of rotation D, a first connecting section 114 is formed extending away from first lever section 112 in the direction parallel to axis of rotation D. In the area of one end of first connecting section 114 spaced apart from first lever section 112, a first projection 1141, or a first protrusion, is additionally formed which extends toward axis of rotation D and towards first contact area 113.

Second clamping element 12 is designed essentially mirror-symmetrically to first clamping element 11, with the exception of such areas and/or elements which function for the rotatable mounting of second clamping element 12 on first clamping element 11, or are necessary for the same. It has a second base section 120, which essentially has a shape of a cuboid extended longitudinally in the direction of axis of rotation D. In the area of an upper side of second base section 120, a second support section 121 is formed, which has a form of a half cylinder extended upward perpendicular to axis of rotation D and with one planar and one cylindrical surface area. In a front area of an underside of second base section 120, a second lever section 122 is formed, which extends essentially perpendicular to axis of rotation D and extends at an obtuse angle α to the second support section 121. On an underside of second base section 120, a second, planar surface area 123 is formed, which functions as a second contact section of a contact area of fastening element 1, and forms the common planar contact area together with first contact area 113 when the fastening element is located in the closed position, as is shown in FIG. 1-4. In an area of one end of second lever section 122 spaced apart from axis of rotation D, a second connecting section 124 is formed extending away from second lever section 122 in the direction parallel to axis of rotation D. In the area of one end of second connecting section 124 spaced apart from second lever section 122, a second projection 1241, or a first protrusion, is additionally formed which extends toward axis of rotation D and towards second contact area 123.

In the closed position of fastening element 1 shown in FIGS. 1 to 4, the two half cylinders, which form the first support section 111 and second support section 121, are positioned such that their respective planar surface areas contact one another. First support section 111 and second support section 121 are thus in the non-splayed support position. A support element is thereby formed which comprises a cylinder 2 which extends perpendicular to axis of rotation D and perpendicular to first contact area 113 and to second contact area 123. At the same time, in the closed position of fastening element 1, first lever section 112 of first clamping element 11 and second lever section 122 of second clamping element 12 are located in the splayed position and have a maximum lever expansion angle $Y_{max}$. First support section 111 of first clamping element 11 and second support section 121 of second clamping element 12 are located, in contrast, in the non-splayed support position and have a support expansion angle of at least approximately 0°. A retaining area is formed between first contact area 113 and second contact area 123 on the one side and first retaining element 114 and second retaining element 124 on the other side, the retaining area having a width $w_{closed}$ in the closed position which represents a minimal retaining width. The minimal retaining width $w_{closed}$ corresponds to a shortest distance between one plane in which the two connecting sections 114, 124 are positioned, and the contact area when lever sections 112, 122 are located in the splayed lever position.

Figure 1:
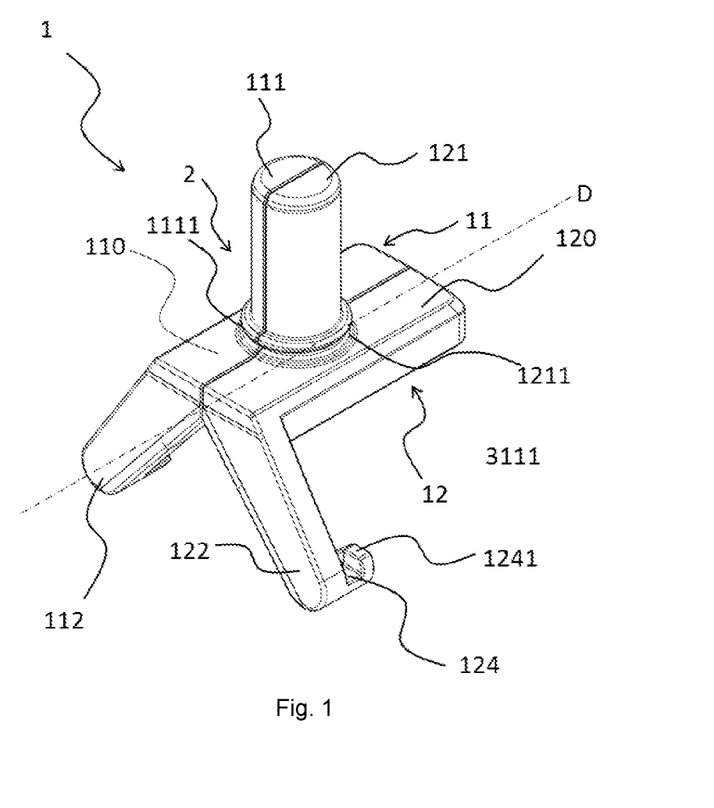
FIG. 1 shows a perspective view of one embodiment of a fastening element according to the invention in a closed position or splayed lever position or non-splayed support position.
Figure 2:
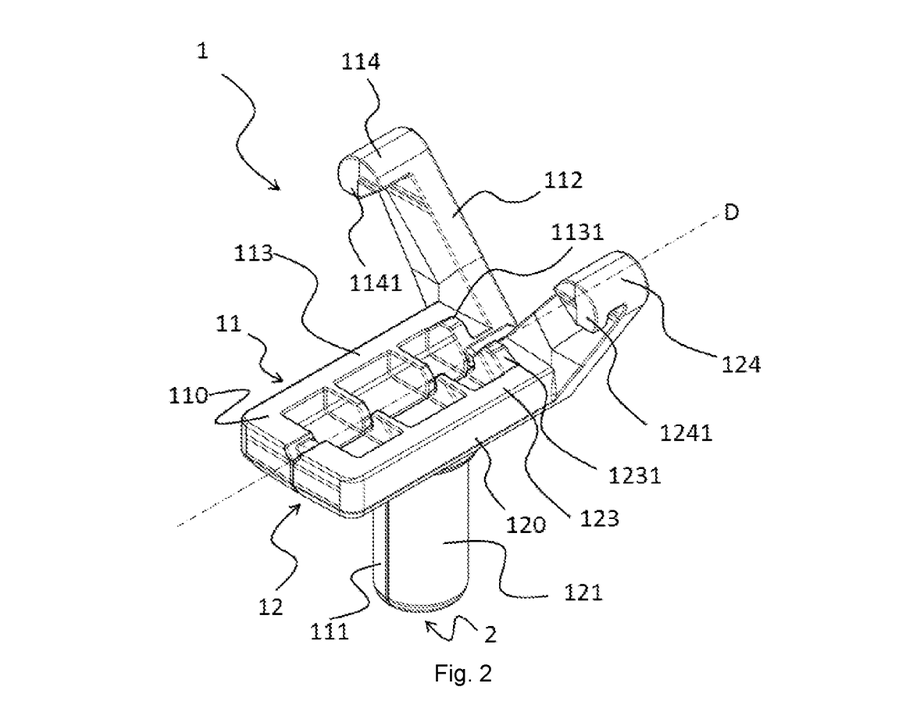
FIG. 2 shows another perspective view of the fastening element from FIG. 1.
Figure 3:
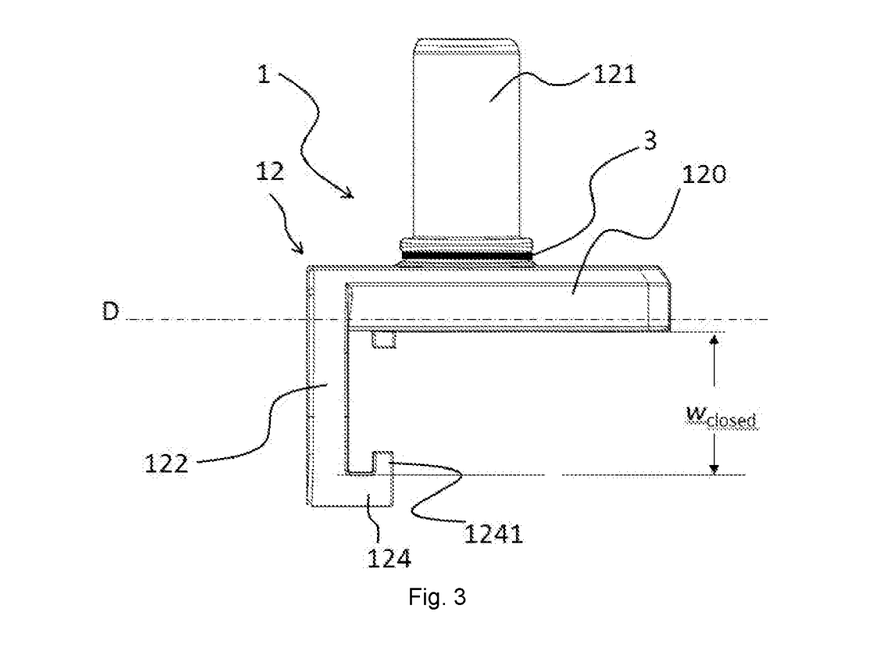
FIG. 3 shows the fastening element from FIG. 1 in a front view perpendicular to the axis of rotation.
Figure 4:
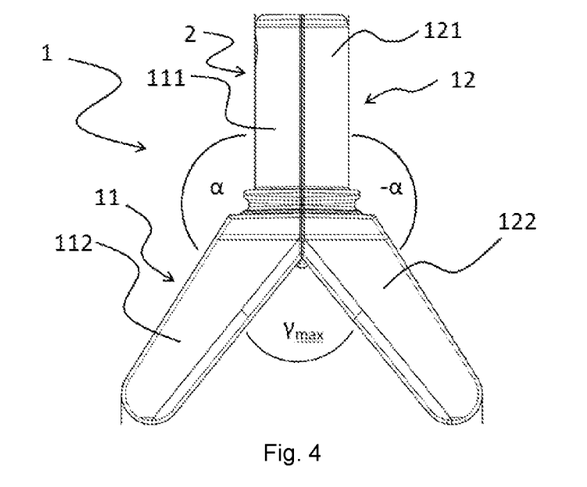
FIG. 4 shows the fastening element from FIG. 1 in a side view in the direction of the axis of rotation.
Figure 5:
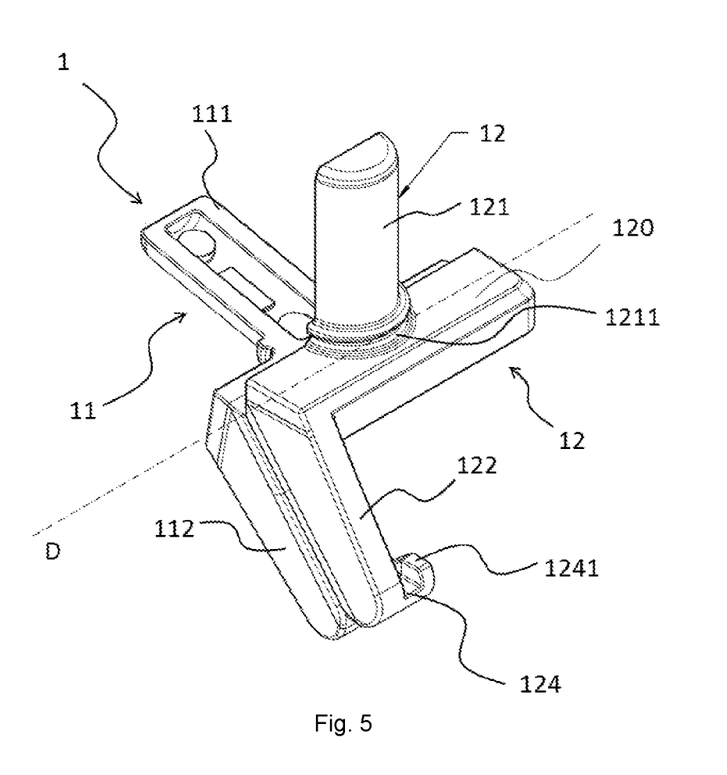
FIG. 5 shows a perspective view of the fastening element from FIG. 1 in an open position or non-splayed lever position or splayed support position.
Figure 6:
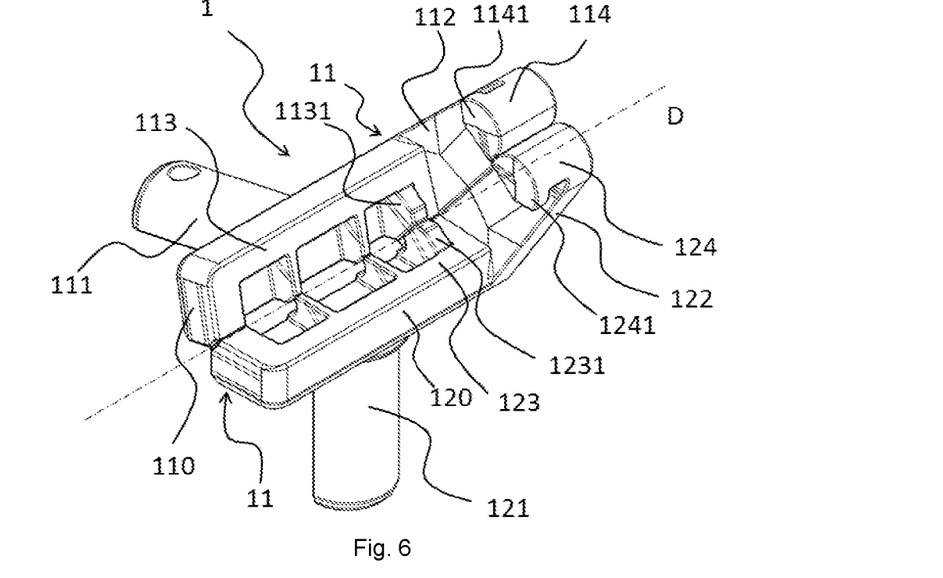
FIG. 6 shows another perspective view of the fastening element from FIG. 5.
Figure 7:
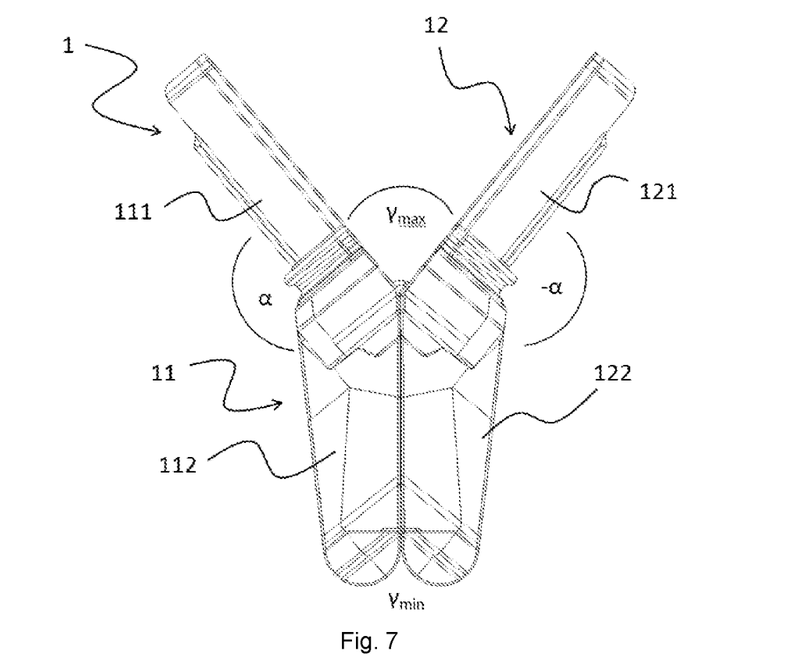
FIG. 7 shows the fastening element FIG. 5 in a front view perpendicular to the axis of rotation.

A groove-shaped first accommodation area 1111 or second accommodation area 1211 is respectively located in a lower area of support sections 111, 112. In the closed position, first accommodation area 1111 and second accommodation area 1211 form a channel running around the support element. As can be seen in FIG. 3, an O-ring 3 is arranged in accommodation areas 1111, 1211 as an elastic band of a spring element. O-Ring 3 pretensions fastening element 1 in the direction of the closed position or presses support sections 111, 121 into the non-splayed support position. O-ring 3 is already at least slightly elastically stretched in the closed position of fastening element 1. If fastening element 1 is moved in the direction of the open position, O-ring 3 is further stretched, and exerts a return torque in the direction of the closed position on clamping elements 11, 12. O-ring 3 thereby constantly presses support sections 111, 121 into the non-splayed support position and lever sections 112, 122 into the splayed position.

In the open position of fastening element 1 shown in FIGS. 5 to 8, first lever section 112 of first clamping element 11 and second lever section 122 of second clamping element 12 are located in a non-splayed position and have a lever splay angle of at least approximately 0°. First support section 111 of first clamping element 11 and second support section 121 of second clamping element 12 are located, in contrast, in a splayed support position and have a support splay angle of at least approximately $Y_{max}$. The retaining area has a maximum width $w_{open}$ in the open position, where $w_{open} > w_{closed}$. The maximum retaining width $wo_pen$ corresponds to a shortest distance between the planes, in which the two connecting sections 114, 124 are positioned, and the contact area when lever sections 112, 122 are located in the non-splayed lever position.

A third projection 1131, in particular in the form of a third protrusion, is formed on the first contact section 113 and extends in a direction away from the axis of rotation D. A fourth projection 1231, in particular in the form of a fourth protrusion, is formed on second contact section 123 and extends in a direction away from axis of rotation D.

Figure 8:
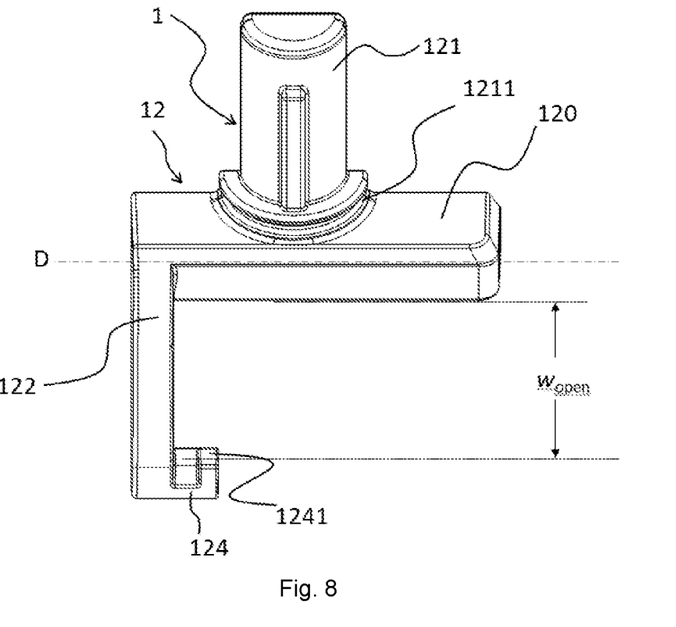
FIG. 8 shows the fastening element from FIG. 5 in a side view in the direction of the axis of rotation.

As is clear in FIG. 8, O-ring 3 is elastically stretched in the splayed support position. By this means, it pulls support sections 111, 121 toward one another back into the non-splayed support position. This simultaneously causes lever sections 112, 122 to be pressed from the non-splayed lever position into the splayed lever position. Clamping elements 11, 12 are thus pretensioned by stretched O-ring 3.

Figure 9:
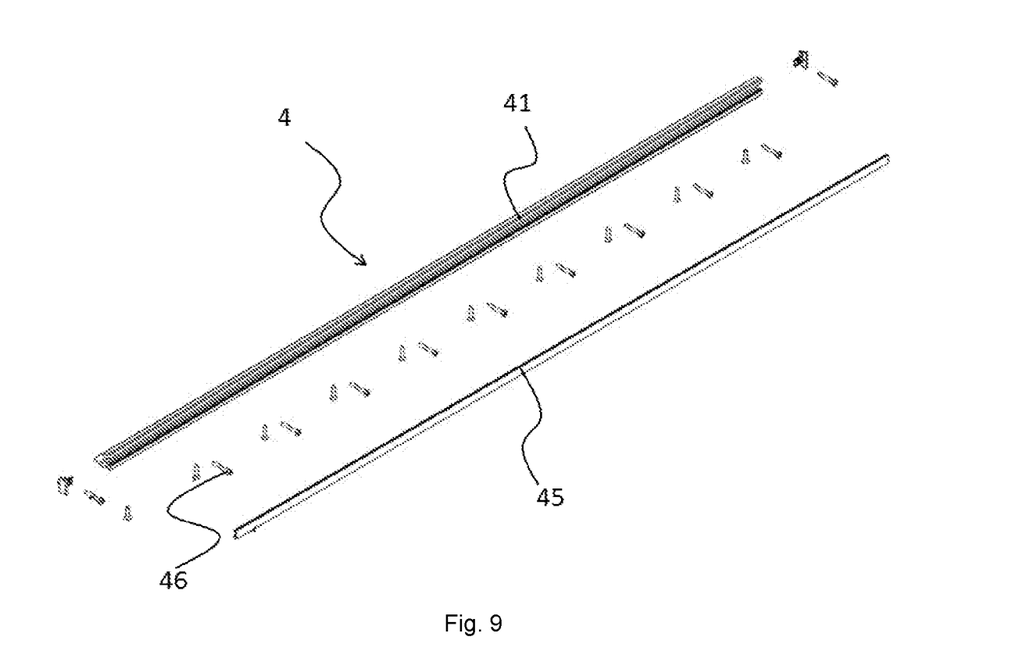
FIG. 9 shows a perspective exploded view of a retaining strip of one embodiment of a mounting system according to the invention for mounting on a particularly plate-shaped base body.
Figure 10:
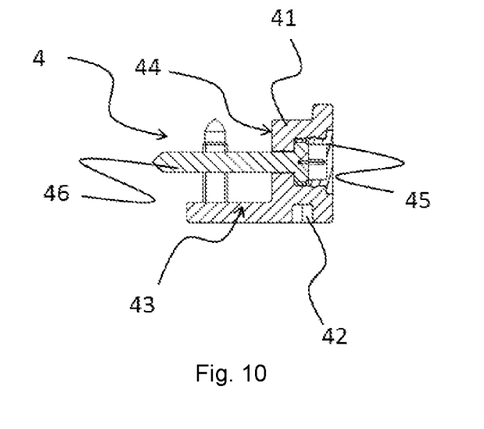
FIG. 10 shows a cross section through the retaining strip from FIG. 9.

FIG. 9 and FIG. 10 show a retaining strip 4 of an embodiment of a mounting system according to the invention in the form of a profile strip for mounting on a particularly plate-shaped base body, for example, a tabletop. Retaining strip 4 comprises a stepped profile 41, fastening screws 46 as the fastening structure, and a front cover 45. Stepped profile 41 forms an undercut and a groove area 42 as the undercut. Retaining strip 4 may be mounted or screwed in the area of an edge or a rim of the plate-shaped base body such that a first contact area 43 contacts at or on a first, a second, in particular lower surface of the plate-shaped article, and a second contact area 44 contacts a lateral edge of the particularly plate-shaped base body. Retaining strip 4 then forms, together with the particularly plate-shaped base body, a particularly plate-shaped article, wherein a first groove or a first undercut is formed in a first surface of the particularly plate-shaped article by the lateral edge of the particularly plate-shaped article in connection with the undercut or stepped profile 41. A second groove or a second undercut is additionally formed by groove area 42 in a second surface of the particularly plate-shaped article.

Even though the invention is depicted and described in detail by means of the figures and the associated description, this depiction and this detailed description are to be understood as illustrative and exemplary, and not as limiting the invention. In order to not transfigure the invention, in certain cases, well-known structures and technologies may not be shown and described in detail. It is understood that persons skilled in the art may make changes and modifications without abandoning the scope of the following claims. In particular, the present invention covers additional embodiments having any combination of features that may deviate from the explicitly described combination of features.

The present disclosure also comprises embodiments with any combination of feature that are listed or shown previously or subsequently to the embodiments. It likewise comprises individual features in the figures, even if they are shown there in conjunction with other features and/or are not listed previously or subsequently. The alternatives described in the figures may be excluded from embodiments and the description and individual alternatives, whose features may be excluded from the subject matter of the invention or from the disclosed subject matter. The disclosure comprises embodiments that exclusively comprise the features described in the claims or in the embodiments, as well as those that comprise additional other features.

Furthermore, the expression "comprises" and deviations thereof do not exclude other elements or steps. Likewise, the indefinite article "a" or "an" and deviations thereof does not exclude a plurality. The functions of many features explained in the claims may be satisfied by a unit or a step. The terms "essentially", "approximately", "roughly", "virtually" and the like, in combination with a property or a value, define in particular the property exactly or the value exactly. The terms "approximately" and "roughly" in conjunction with a given numeric value or range may relate to a value or range which is positioned within 20%, within 10%, within 5% or within 2% of the given value or range.

The present invention comprises additional variants of fastening elements, mounting systems, and composite pieces of furniture. In particular, the subsequent variants are also disclosed which or whose features may be combined with one another or with the invention:

Variant 1 is a fastening element for positive locking or clamping fastening on a particularly plate-shaped article, comprising
a. a first clamping element,
b. a second clamping element rotatably mounted on the first clamping element with respect to an axis of rotation, wherein
c. the first clamping element comprises
    a first support section extending essentially perpendicular to the axis of rotation,
    ii. a first lever section extending essentially perpendicular to the axis of rotation and at an obtuse angle to the first support section, and
    iii. a first contact area extending at least in the direction toward the axis of rotation, and
    iv. wherein a first connecting section is provided on the first lever section and
  extends away from the lever section parallel to the axis of rotation;
d. the second clamping element comprises
    i. a second support section extending essentially perpendicular to the axis of rotation,
    ii. a second lever section extending essentially perpendicular to the axis of rotation and at an obtuse angle to the second support section, and
    iii. wherein a second connecting section is provided on the second lever section and extends away from the lever section parallel to the axis of rotation; wherein
e. the fastening element
    i. may be translated from a closed position into an open position by rotating the second clamping element about the axis of rotation in a first orientation while splaying the support sections,
    ii. may be translated from the open position into the closed position by rotating the second clamping element about the axis of rotation in a second orientation opposite the first while splaying the lever sections,
    iii. has a retaining area for the article, said retaining area being formed between the first contact area and the two connecting sections; and
f. a first width of the retaining area in the open position is increased with respect to a second width of the retaining area in the closed position.

Variant 2 is a fastening element according to Variant 1, characterized in that the first connecting section is formed in the area of one end of the first lever section spaced apart from the axis of rotation and the second connecting section is formed in the area of one end of the second lever section spaced apart from the axis of rotation.

Variant 3 is a fastening element according to Variant 1 or 2, characterized in that the second clamping element comprises a second contact area extending at least in the direction of the axis of rotation.

Variant 4 is a fastening element according to Variant 3, characterized in that
a. the first contact area is formed from a first planar surface area, formed on the first clamping element, oriented parallel to the axis of rotation,
b. the second contact area is formed from a second planar surface area, formed on the second clamping element, oriented parallel to the axis of rotation,
c. the first and the second planar surface areas are aligned parallel to one another in the closed position of the fastening element, and
d. form a common, preferably contiguous contact area, wherein the retaining area is formed between the common contact area and the two connecting sections.

Variant 5 is a fastening element according to one of the preceding variants, characterized in that, in the closed position, the first support section and the second support section form a cylinder extending perpendicular to the axis of rotation, wherein they preferably contact one another.

Variant 6 is a fastening element according to one of the preceding variants, characterized in that a first projection if formed in the area of an end of the first connecting section spaced apart from the first lever section, said projection extending in the direction toward the axis of rotation and/or toward the first contact area; and/or a second projection is formed in the area of an end of the second connecting section spaced apart from the second lever section, said projection extending in the direction toward the axis of rotation and/or toward the first and/or second contact area.

Variant 7 is a fastening element according to one of the preceding variants, characterized in that the fastening element has means, in particular an elastic element, for pre-tensioning the fastening element in the direction toward the closed position.

Variant 8 is a fastening element according to Variant 7, characterized in that the elastic element comprises an at least essentially annular elastic band which extends around the first and the second support sections, preferably in an area close to the axis of rotation.

Variant 9 is a fastening element according to one of the preceding variants, characterized in that the clamping elements are elastically implemented.

Variant 10 is a fastening element according to one of the preceding variants, characterized in that the first clamping element preferably has a cylindrical opening, preferably borehole, in an area between the first support section and first lever section extending parallel to the axis or rotation for rotatable mounting of the second clamping element.

Variant 11 is a fastening element according to Variant 10, characterized in that the first contact area is formed by a surface area of the first clamping element, said contact area representing an area of a cylinder surface, said cylinder surface extending concentrically to the cylindrical opening.

Variant 12 is a furniture system comprising
a. a particularly plate-shaped article with a first, in particular upper, surface and a second, in particular lower, surface extending parallel to and lying opposite the first,
b. a fastening element according to one of the preceding variants, which is fastened on the particularly plate-shaped article in the closed position, wherein
  i. the first contact area or the common contact area contacts the first surface;
  ii. the first and the second connecting section contact the second surface.

Variant 13 is a furniture system according to Variant 12, characterized in that
a. a first groove or a first undercut running parallel to an edge is provided in the second surface in the area of the edge of the particularly plate-shaped article, and
b. the fastening element is formed according to Variant 6, wherein the first projection and the second projection project into the first groove or into the first undercut.

Variant 14 is a furniture system according to Variant 12 or 13, characterized in that
a. the particularly plate-shaped article has a thickness d, and
b. the fastening element is formed according to Variant 9, and
c. the thickness d slightly exceeds the width $w_{closed}$ of the retaining area in the closed position, in particular by 1% through 20%, preferably by 2% through 5%.

Variant 15 is a mounting system for detachable mounting of an object on a particularly plate-shaped article, said mounting system comprising a fastening element according to one of the preceding variants and a retaining strip, wherein the retaining strip
a. has a fastening structure with which the retaining strip may be fastened on an edge of the article, and
b. is dimensioned such that the first clamping element of the clamp and the second clamping element of the clamp hold the retaining strip when the first lever section of the first clamping element of the clamp and the second lever section of the second clamping element of the clamp are located in the splayed lever position, and do not hold the retaining strip when the first lever section of the first clamping element of the clamp and the second lever section of the section clamping element of the clamp are located in the non-splayed lever position.

What is claimed is:

1. A fastening element for positive locking or clamping fastening on a particularly plate-shaped article, comprising:
a first clamping element; and
a second clamping element rotatably mounted about an axis of rotation relative to the first clamping element,
wherein the first clamping element has
  a first lever section extending essentially perpendicular to the axis of rotation and
  a first connecting section extending from the first lever section essentially parallel to the axis of rotation,
wherein the second clamping element has
  a second lever section extending essentially perpendicular to the axis of rotation and
  a second connecting section extending from the second lever section essentially parallel to the axis of rotation,
wherein the first lever section of the first clamping element and the second lever section of the second clamping element are moveable about the axis of rotation between a splayed lever position and a non-splayed lever position,
wherein the first clamping element and the second clamping element are configured to hold the article when the first lever section of the first clamping element and the second lever section of the second clamping element are in the splayed lever position, and not to hold the article when the first lever section of the first clamping element and the second lever section of the second clamping element are in the non-splayed lever position,
wherein the first clamping element comprises a first support section, which extends essentially perpendicular to the axis of rotation, is connected stationarily to the first lever section of the first clamping element to concurrently move about the axis of rotation with the first lever section, and extends at an obtuse angle to the first lever section of the first clamping element,
wherein the second clamping element comprises a second support section, which extends essentially perpendicular to the axis of rotation, is connected stationarily to the second lever section of the second clamping element to concurrently move about the axis of rotation with the second lever section, and extends at an obtuse angle to the second lever section of the second clamping element,
wherein the first support section of the first clamping element and the second support section of the second clamping element are rotated into a non-splayed support position when the first lever section of the first clamping element and the second lever section of the second clamping section are rotated into the splayed lever position, and
wherein the first support section of the first clamping element and the second support section of the second clamping element are rotated into a splayed support position when the first lever section of the first clamping element and the second lever section of the second clamping section are rotated into the non-splayed lever position.

2. The fastening element according to claim 1, wherein the first clamping element and the second clamping element are each designed as one piece.

3. The fastening element according to claim 1, which comprises a contact area, which is configured to contact the article during a fastening of the fastening element on the article, wherein the first lever section of the first clamping element and the second lever section of the second clamping element are located in the splayed lever position.

4. The fastening element according to claim 3, wherein a retaining area is formed between the contact area and both of the first connecting section of the first clamping element and second connecting section of the second clamping element, the width of said retaining area is smaller in the splayed lever position of the first lever section of the first clamping element and the second lever section of the second clamping element than in the non-splayed lever position of the first lever section of the first clamping element and the second lever section of the second clamping element.

5. The fastening element according to claim 3, wherein a shortest distance between a plane, in which the first connecting section of the first clamping element and the second connecting section of the second clamping element are positioned, and the contact area, in the splayed lever position of the first lever section of the first clamping element and the second lever section of the second clamping element, is smaller than in the non-splayed lever position of the first lever section of the first clamping element and the second lever section of the second clamping element.

6. The fastening element according to claim 3, wherein the contact area extends in the direction of the axis of rotation.

7. The fastening element according to claim 3, wherein the first clamping element has a first contact section and the second clamping element has a second contact section which together form the contact area.

8. The fastening element according to claim 1, which comprises a spring element being arranged to press the first clamping element and the second clamping element into the splayed lever position and into the non-splayed support position.

9. The fastening element according to claim 8, wherein the spring element has an elastic band which is arranged around the first support section of the first clamping element and the second support section of the second clamping element.

10. The fastening element according to claim 1, in which the first lever section of the first clamping element and the second lever section of the second clamping element each have two longitudinal ends, wherein the axis of rotation is arranged in an area of one of the longitudinal ends and the first connecting section or the second connecting section is arranged in an area of the other of the longitudinal ends.

11. The fastening element according to claim 3, in which the first connecting section of the first clamping element and the second connecting section of the second clamping element each has a protrusion which extends in the direction toward the axis of rotation and/or toward the contact area.

12. The fastening element according to claim 7, wherein
the first contact section of the first clamping element is formed from a first planar surface area formed on the first clamping element,
the second contact section of the second clamping element is formed from a planar surface area formed on the second clamping element, and
the first and the second planar surface areas are positioned essentially in a plane in the closed position of the fastening element such that they form the contact area.

13. The fastening element according to claim 1, wherein the first support section of the first clamping element and the second support section of the second clamping element form together, in the non-splayed support position, in which they preferably contact one another, a cylinder extending perpendicular to the axis of rotation.

14. A mounting system for detachable mounting of an object on a particularly plate-shaped article, said mounting system comprising a fastening element according to claim 1 and a retaining strip, wherein the retaining strip
has a fastening structure with which the retaining strip is fastenable on an edge of the article, and
is dimensioned such that the first clamping element of the fastening element and the second clamping element of the fastening element hold the retaining strip when the first lever section of the first clamping element of the fastening element and the second lever section of the second clamping element of the fastening element are located in the splayed lever position, and do not hold the retaining strip when the first lever section of the first clamping element of the fastening element and the second lever section of the second clamping element of the fastening element are located in the non-splayed lever position.

15. A furniture system comprising
a particularly plate-shaped article with a first surface and a second surface extending parallel to and lying opposite the first surface,
a fastening element according to claim 3, which is fastened in a closed position in a clamping way or positive locking way on the article, wherein
the contact area of the fastening element contacts the first surface, and
the first connecting section of the first clamping element of the fastening element and the second connecting section of the second clamping element of the fastening element contact the second surface.

16. The furniture system of claim 15, wherein the first surface is an upper surface and the second surface is a lower surface.

17. The fastening element according to claim 2, which comprises a contact area, which is configured to contact the article during a fastening of the fastening element on the article, wherein the first lever section of the first clamping element and the second lever section of the second clamping element are located in the splayed lever position.

18. The fastening element according to claim 4, wherein a shortest distance between a plane, in which the first connecting section of the first clamping element and the second connecting section of the second clamping element are positioned, and the contact area, in the splayed lever position of the first lever section of the first clamping element and the second lever section of the second clamping element, is smaller than in the non-splayed lever position of the first lever section of the first clamping element and the second lever section of the second clamping element.

* * * * *